Nov. 15, 1960  E. H. CLARK  2,960,570
AUTOMATIC CODE TRANSLATING SYSTEMS
Filed Nov. 12, 1958  6 Sheets-Sheet 1

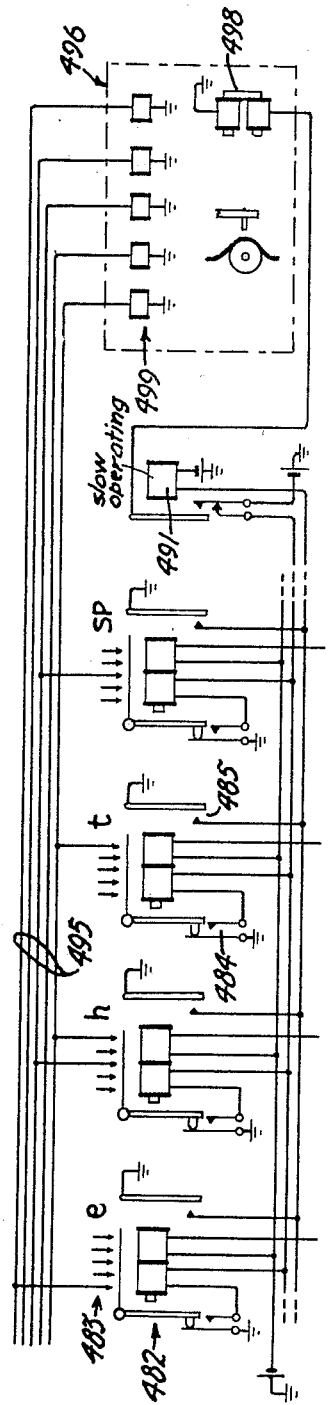

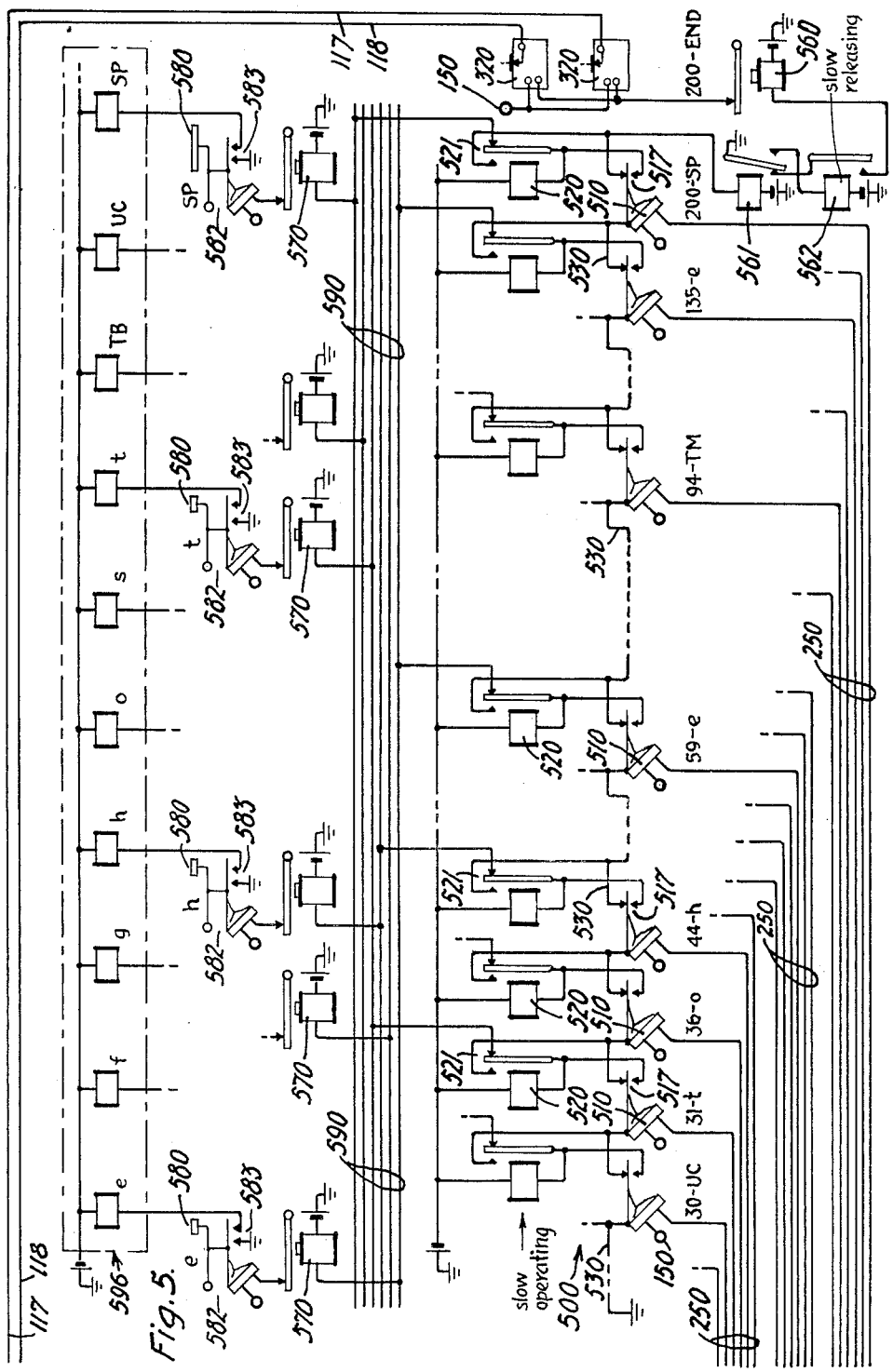

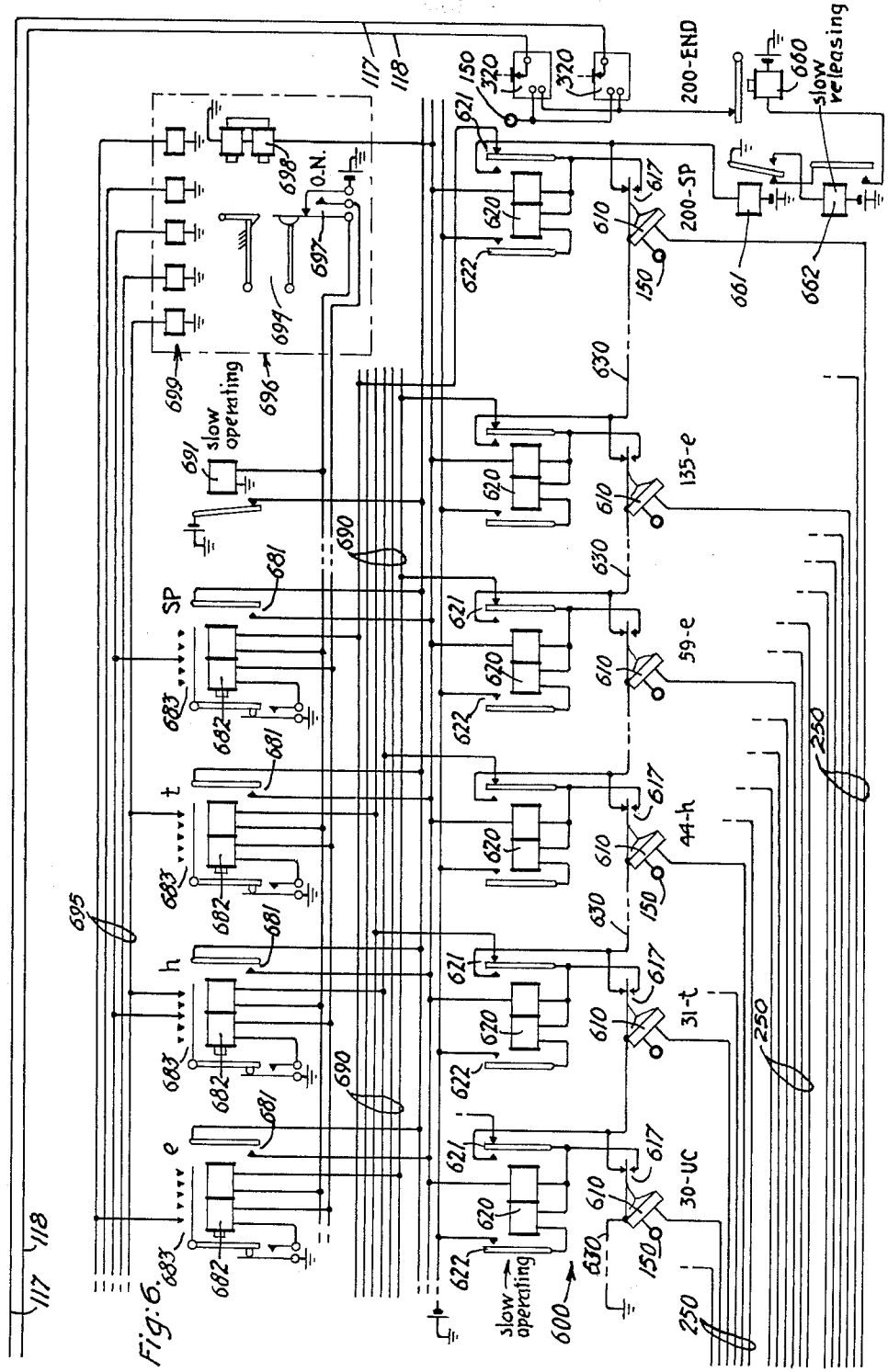

United States Patent Office 2,960,570
Patented Nov. 15, 1960

2,960,570

AUTOMATIC CODE TRANSLATING SYSTEMS

Edgar H. Clark, deceased, late of Flushing, N.Y., by Edgar Harrison Clark, Jr., executor, 1135 16th St. NW., Washington 6, D.C., assignor to Edgar H. Clark, Jr.

Filed Nov. 12, 1958, Ser. No. 773,471

20 Claims. (Cl. 178—26)

The invention relates to automatic code translating or converting systems and particularly to systems of this kind in which a message recorded in code of a primary code system may be automatically translated for recording in characters of generally used letters, numerals and signs or for conversion into a different code system.

The invention is closely related to the translating and recording systems disclosed in Patents 2,351,663 issued on June 20, 1944 and 2,283,538 issued on May 19, 1942. It is also related to the copending application Ser. No. 540,943 filed on September 17, 1955 and issued as Patent 2,873,837 issued on February 17, 1959.

It is a principal feature of the present invention to provide modifications of the system shown in patent and particularly of the sequence control series and the associated equipment for the outgoing codes, shown in Fig. 3 of that patent.

The main objects of said modifications are to extend the field of operation of the system; to simplify certain parts of the system with consequent reduction of initial cost and continued maintenance; to speed up the operation of the system.

In accordance with a feature of the invention the output side of the system is partly composed of electric elements and the remaining elements are of the pneumatic type but greatly simplified over the corresponding elements in Fig. 3 of Patent 2,873,837.

It should be understood that the system provided in accordance with the invention, as disclosed in the following description and attached drawings, may be modified in various respects without a departure from the spirit and scope of the invention which is defined by the attached claims.

GENERAL DESCRIPTION OF THE SYSTEM

The system provided in accordance with the present invention is adapted for translation and recording of a code message which has been impressed upon a primary medium.

In a preferred form, as disclosed hereinafter, the system is of the pneumatic type which utilizes valves and bellows operated over airpassages for operation in coordination with suitable mechanical devices, in a manner similar to that disclosed in my Patent 2,351,663. The system in this form is therefore particularly adapted to respond to code messages which have been recorded as holes or punchings variously distributed in successive rows across a tape in accordance with corresponding letter codes. A code message recorder for this purpose is disclosed in Patent 2,351,663, referred to above, together with details of a standard code system for which the present system in its preferred form is particularly adapted.

The system is adapted for impressing the code message in translated form upon a typing or other retransmission machine of standard construction. It is a feature of the invention to combine the functions of pneumatic devices with those of electrical devices for the full and efficient utilization of their different operating features, space requirements, need for duplication and costs.

In accordance with the invention and as shown in Figs. 3 and 4 the outgoing system shown in Fig. 3 of Patent 2,873,837 is adapted for impressing an outgoing code upon a pneumatic typewriter, as in that patent, and for impressing electrically a permutation code of a few electric elements upon a re-transmission system particularly adapted for long distance transmission.

In accordance with modifications of this feature of the invention, shown in Figs. 5 and 6, electric functioning is extended into the sequence control series replacing part of the pneumatic equipment shown in the patent. This permits of an appreciable increase in speed of the series and a simplification of the equipment.

In accordance with another modification, shown in Fig. 6 the partly electrified outgoing system is specially adapted for impressing a permutation code of electric pulses on a device adapted for retransmission of the code elements one at a time.

The principal elements of the system include a code reading device in which the prepared code tape is placed, a translating equipment for translating the recorded code into mechanical settings representing the outgoing code, a code spelling equipment for spelling out the outgoing code and transferring it to a sequence control equipment, which in turn impresses the individual code elements upon a receiving device or other suitable apparatus.

The code for which the present system is specifically devised has been fully described in Patent 2,351,663. The system may however readily be modified to operate with other codes.

In accordance with the present coding plan a fixed Full Spelling code is provided which involves the punching of a hole in the record tape for some individual letters or signs or of two, three or more holes in a single row across the record tape for each of other individual letters or signs.

For this recording words are divided into syllables and the letters of each syllable are simultaneously recorded in a single row across the tape. The syllables of a word are thus recorded in successive rows and a space punching is included with the last syllable.

In view of the simultaneous appearance of several punchings in a single line across the tape the code provides for a sequence which is universally applicable to practically all syllables in any modern language.

Thus confining the explanation to the English language the syllables in Full Spelling each contain one or more Vowels which may be preceded by Initial consonants and succeeded by Final consonants. Nearly all consonants appear in each of these two groups. In each group the characters are furthermore arranged in a certain sequence from left to right. Thus, with the letter groups Initial, Vowel and Final arrangement from left to right and the letters in each group arranged from left to right through the entire system, each full syllable may be recorded in a single row on the record tape, translated and transferred by single steps and finally printed one character at a time, and successive syllables may be similarly treated and printed by the provisions of the present system.

In cases when letters in a syllable appear in an order different from that established by the code it may be necessary to record one letter at a time, that is, in each row across the tape.

For details of these letter combinations and sequences reference may be had to Patent 2,351,663.

In accordance with the present code plan provision is also made for abbreviated spelling for the sake of speeding up the recording. Thus what is termed Phonetic spelling involves the use of a single or a few letters to represent a whole syllable or a whole word, and in what is termed Phrasing one, two or a few letters may represent a long word or two or more words in frequently used combinations or phrases. The letters appear in a single row on the tape.

For examples of codes which are frequently used in Phrasing and Phonetic reference may be had to Patent 2,351,663.

The code reading device which holds the record tape is described in some detail in Patent 2,351,663 where it is illustrated in Fig. 8A. It is shown schematically to the left in Fig. 1 of the drawings attached hereto.

The device comprises in the main a pair of spaced rollers for passing a long record tape, which may be of paper. A stepping arrangement is associated with one roller for advancing the tape. Between the two rollers the tape passes over a smooth reading bar, which has a series of air holes or reading vents through it in alinement with rows of perforations across the tape. The vents are put under suction each time the tape has been stepped to a new position. The tape normally closes the vents so that the suction may be maintained. When a perforation or punching stops over a vent, air will be admitted for the operation of an associated power device, such as a bellows.

The bellows thus associated with corresponding air or reading vents in the code reading device are part of the translating device, shown in Fig. 1.

This device may be designed in many different ways, the main principle being that of two sets of elements disposed more or less at right angles to one another, so that each element in one set will cross all elements in the other. One set of elements, the primary or code receiving bars, are operated by the bellows referred to in response to the presence of punching in the record tape. Thus one or more bars may be operated at one time into their alternate position in response to punchings in a single row across the tape. Such bars are returned to normal at the time the tape is advanced and the punchings removed from the vents.

The other set of elements, the secondary or code reading bars are operated selectively in accordance with the settings in the code receiving bars.

For references to different types of translating devices suitable for the present purpose Patent 2,351,663 may be consulted.

The translating equipment is divided into two main divisions, one for Full Spelling and the other for Phrasing and Phonetic. This second division will be referred to hereinafter as Phonetic. The two divisions may however overlap to some extent, thereby permitting double use of some apparatus.

The secondary bars in the Full Spelling translator are arranged in the same sequential order, say from left to right, as prevails in the coding plan. Thus bars responsive to settings from Initial punchings may be furthest to the left, the Vowel bars may be next and the Final bars furthest to the right. In this manner the code sequence may be advanced through the Full Spelling section of the translator to the spelling equipment.

As to the secondary bars in the Phonetic section of the translator the same general sequence arrangement may be used, but here each code combination is considered by itself with its own code elements arranged in the general order.

The outgoing code spelling equipment, shown in Fig. 2, serves to spell out the outgoing code elements, assigned to and represented by the individual secondary bars in the translator, by impressing such code elements upon the sequence control equipment. Thus each bar, when selected, operates a spelling unit which controls the suction passages for one or more sequence valve units in accordance with the selected code.

The sequence control equipment, shown in different forms in Figs. 3, 5 and 6, comprises a long series of code units which directly control the output from the system. Each sequence unit represents an outgoing code element and is operated from the spelling equipment. Each sequence unit is effective in operating a corresponding letter unit in the retransmission system, which may be a key bar in an automatic typewriter or some intermediate operating element for a code transmission device. Each sequence unit furthermore controls the sequence series for the operation of subsequent units, so that only one character in the transmitting device will be operated at a time.

The fundamental sequence from left to right is maintained in the sequence control equipment, in as much as the characters represented in each spelling unit in the spelling equipment are also represented by sequence units in the sequence control equipment, which are dispersed along the series in the original sequence though separated by other units.

In the sequence series each code element impressed upon the outgoing code spelling equipment, shown in Fig. 2, is represented by varying numbers of sequence units dependent upon the frequency of its use. The first criterion is that there must be enough pertinent units to spell out fairly long phrases. The second criterion is that for such phrases or for complex syllables the required characters must be available in the fundamental sequence so that they may be reproduced in their proper order.

In the present system there is one code receiving or primary bar in the translator equipment for each air passage in the tape reading bar. Since all of these primary bars must be available both for Full Spelling and Phonetic it is necessary to provide some form of discrimination between these two uses of the same set of primary bars.

In Patent 2,351,663 the discrimination was determined by the presence or absence of a vowel in the symbols recorded in a single row across the tape. This provision does put limitations upon the choice of symbols representing whole words or phrases.

In the present system this discrimination simply depends on whether the symbol combination set up in a single row across the record tape is one which will have a corresponding appearance in the Phonetic division, so that a secondary bar in that division will respond thereto.

The need for such discrimination is due to the fact that the Full Spelling division of the translator has its secondary bars grouped in three groups, namely Initial, Vowel and Final, where a translation is performed independently in each by corresponding primary bars and secondary bars, unaffected by settings of primary bars in the other two groups, whereas in the Phonetic or Phrasing division of the translator settings of all operated primary bars combine to select a single secondary bar.

It will thus be seen that without such discrimination a code for setting of primary bars in any of the Initial, Vowel or Final groups in Phonetic for selection of a secondary bar might very well also select secondary bars in any one or two of these groups in Full Spelling, since each group there is independent of the other. It must therefore be prevented that code readings be impressed upon secondary bars in Full Spelling before Phonetic has been tried.

In the present system, therefore, the Phonetic division of code reading or secondary bars is rendered responsive before the Full Spelling division, so that secondary bars in the Phonetic division will have first choice and, if one is selected, will prevent operation of the Full Spelling division all together. Such stepwise operation may be attained by any suitable mechanism, as by a timing device. The Phonetic division is given preference in this arrangement since it will be used more frequently.

For a fuller understanding of the invention reference may be had to the following detailed description which should be read in conjunction with the attached drawings in which Fig. 1 shows diagrammatically the tape reading device and part of the translating equipment;

Fig. 4 shows an electric tape perforating device and operating equipment therefor responsive to the sequence control equipment in Fig. 3;

Fig. 5 shows an alternative arrangement for the system in Figs. 3 and 4, particularly adapted for the operation of an electric typing device and including a partly electrified sequence control equipment;

Fig. 6 shows another alternative arrangement particularly adapted for the operation of an electric rotating code transmitting device and Fig. 7 shows schematically details of the pneumatic valves used in the sequence units in Fig. 3 together with some directly associated parts of the system;

Figure 1:
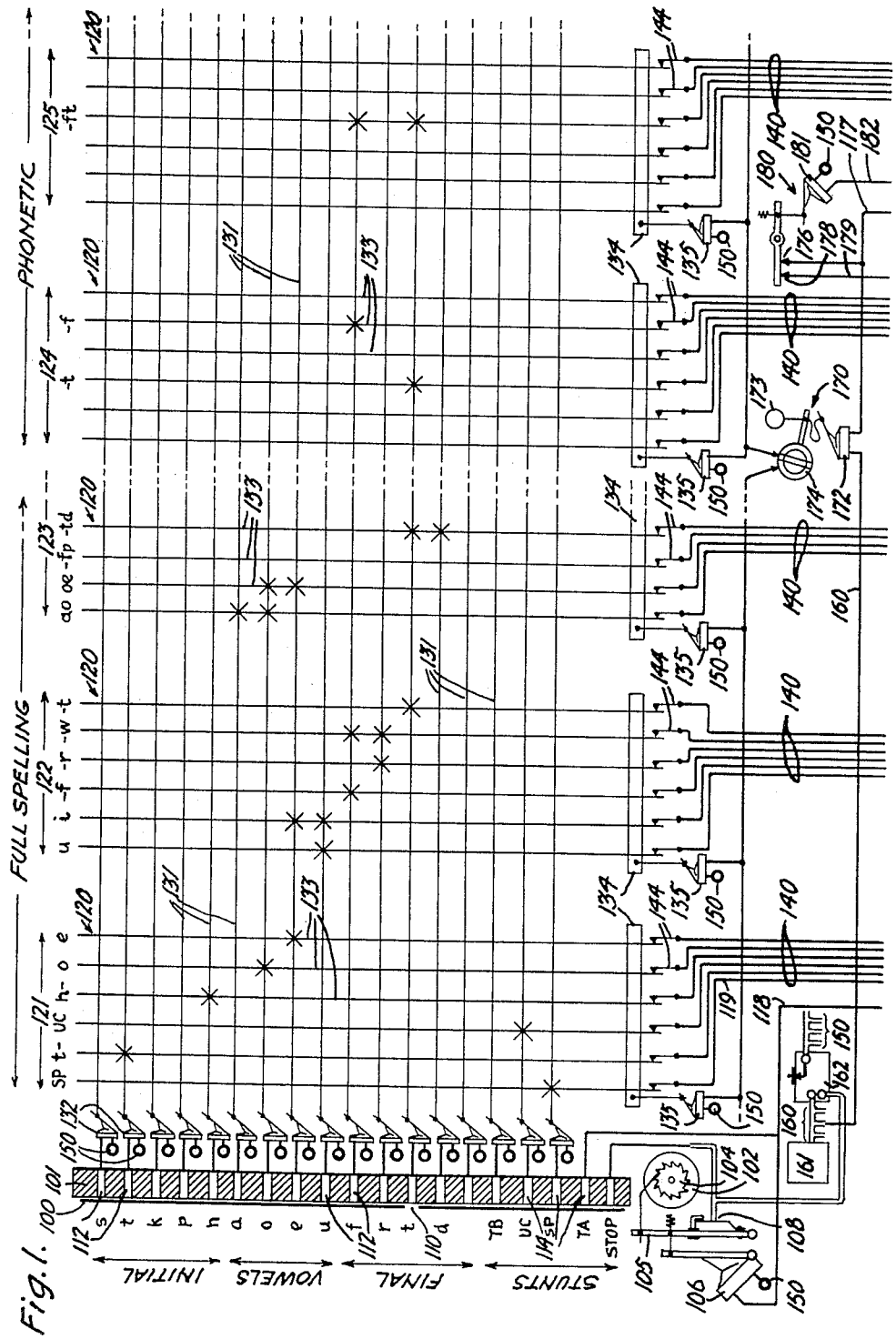
Figure 2:
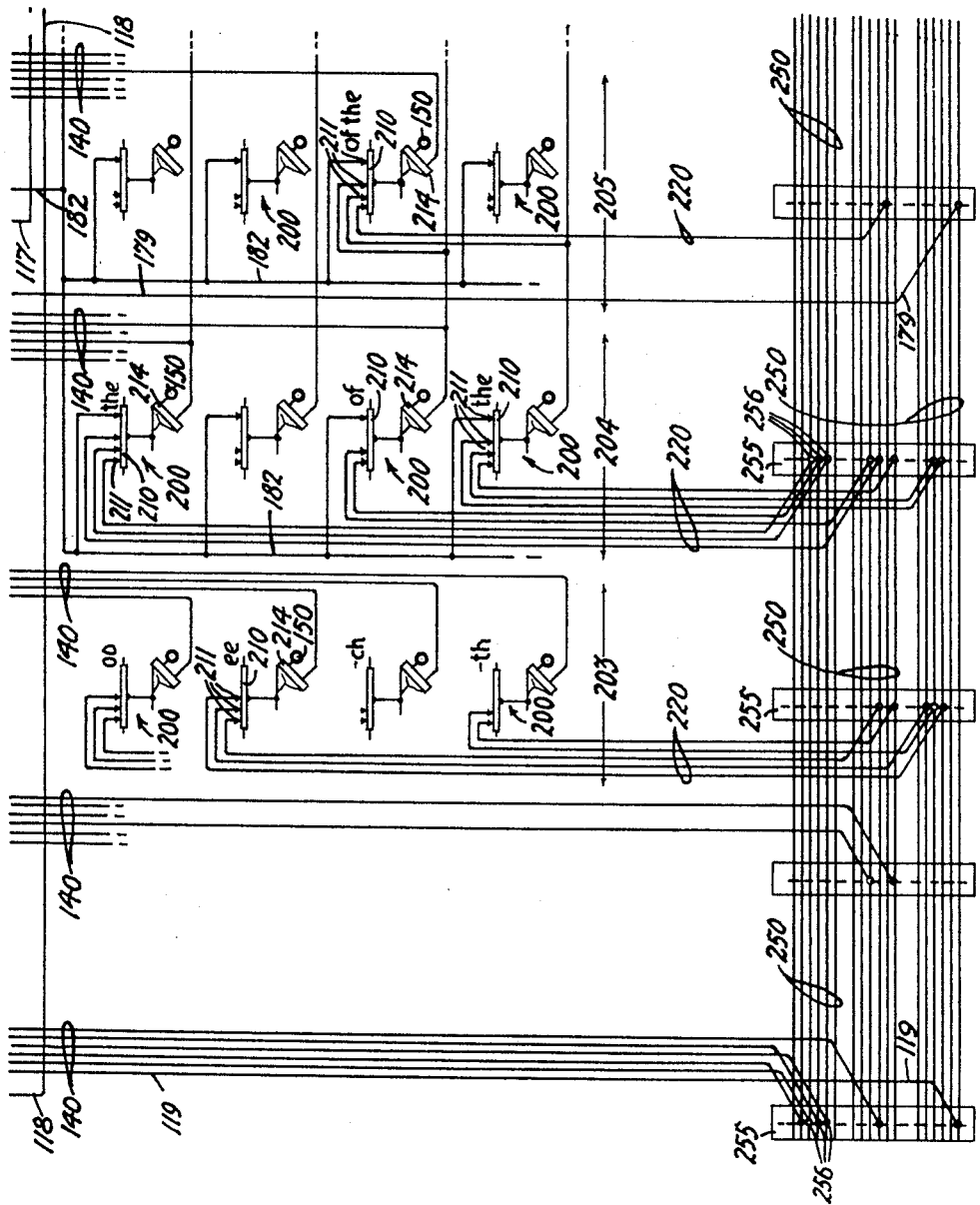
Fig. 2 shows part of the outgoing code spelling equipment.

Fig. 8 shows how Figs. 1, 2, 3 and 4 should be placed together to show one form of the system, Fig. 8A shows the same for Figs. 1, 2 and 5, and Fig. 8B shows the same for Figs. 1, 2 and 6.

Figure 3:
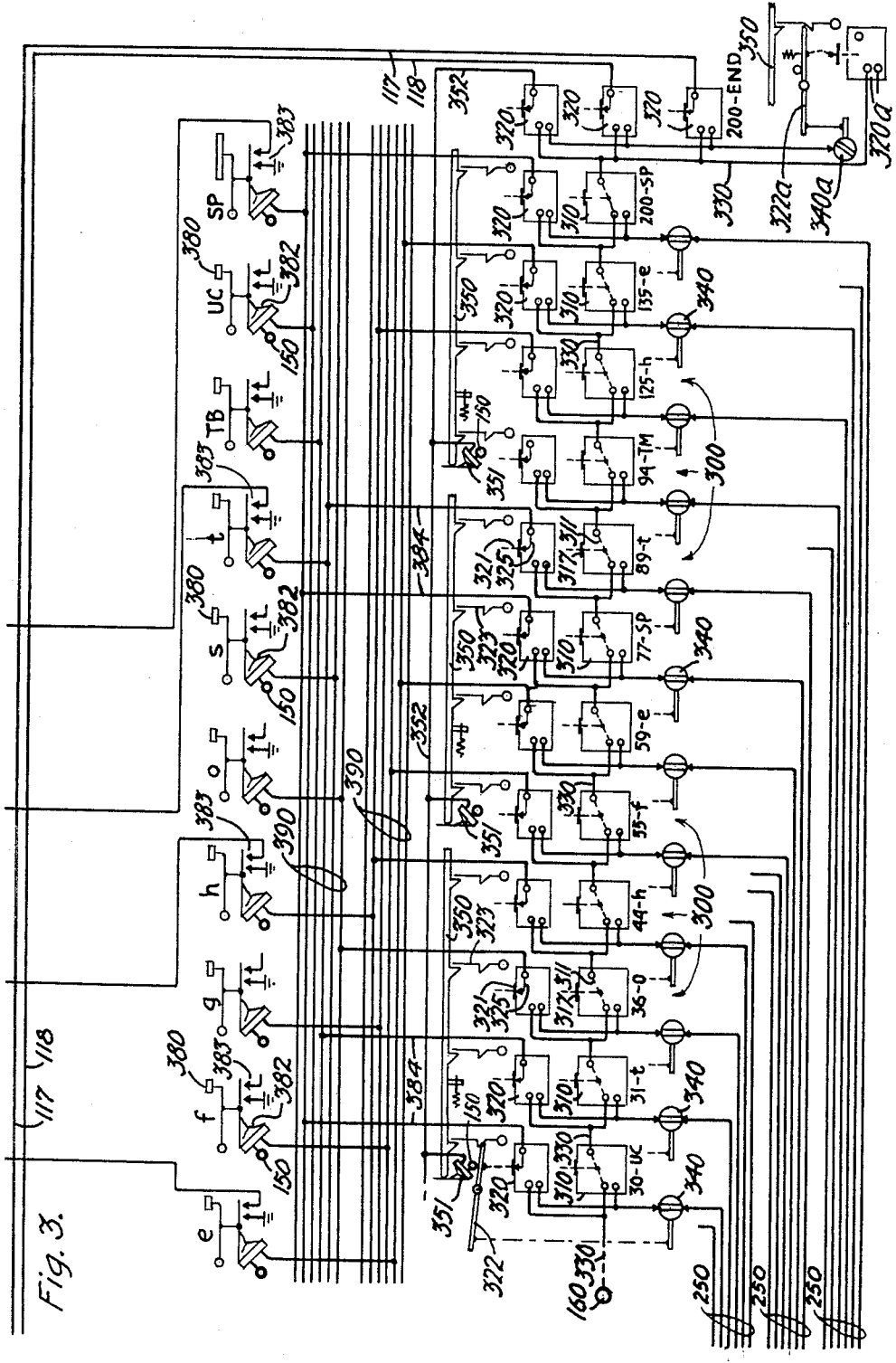
Fig. 3 shows part of the sequence control equipment and some parts of a pneumatic recording device.

*Detailed description of equipment shown in Figs. 1, 2 and 3*

The code or tape reading device is shown diagrammatically to the left in Fig. 1. For details of this device reference may be had to Patent 2,351,663. The record tape 100 and reading bar 101 are shown in cross-section through the record row of code punchings 110 (only one shown) and the row of reading vents or air passages 112. At the lower end of bar 101 is shown the tape driving roller 102 with ratchet wheel 104 and stepping lever and pawl 105 for advancing the tape one row at a time on the back stroke of the pawl. The lever 105 is operated by the tripvalve controlled bellows 106 against a return spring, and it controls an air vent 108 for de-vitalizing most of the system during the stepping operation and restoring the system for functioning upon return to normal and positioning of a new record row.

As will appear from Fig. 1 the system is sectionalized into a plurality of translator units 120, some of which are set by the Full Spelling codes and others by the Phonetic codes, which will hereinafter be considered as including Phrasing codes.

Each translator unit mainly comprises: a set of primary or code receiving bars 131 with their individual operating bellows 132 operated from the reading bar 101; a set of secondary or code reading bars 133 disposed at right angles to the primary bars 131; a common operating structure or testing bail 134 which normally lifts all the bars 133 and is mounted for admitting the bars 133 into testing contact with the bars 131 by means of operating bellows 135.

The primary bars 131 in all units of Full Spelling and Phonetic are responsive to the punchings in the code tape and corresponding primary bars in the different units may be mechanically interconnetced to be operated simultaneously by a bellows 132. The bars are operable lengthwise between normal and selected positions. The facing edge of each bar has notches (not shown) cut relative to the crossing secondary bars in accordance with code requirements. Thus in general there is normally a notch facing the straight edge of each secondary bar to permit the latter to be fully admitted without operation of the primary bars. However at the crossings of a primary bar with any of its assigned secondary bars the notches are normally placed in the alternate or selected position of the primary bar, which thus must be moved to permit any one of the assigned secondary bars to be admitted into its alternate or selected position. Thus normally each secondary bar is blocked at one or a few primary bars. When these are operated one secondary bar is admitted by them, but all other secondary bars are blocked by them.

The secondary bars 133 are moved by their own weight. They are held up clear of the notches by the balanced testing bail 134. The bellows 135, when operated, overcome the unbalance so that all bars 133 will be moved; all unselected bars move a short initial distance only and one bar 133, which finds a clear path, will move the full distance into the notches. Each bar 133 is associated with suitable means for controlling a vent 144 for an individual airpassage or tubing 140, normally under suction, leading to the outgoing code spelling equipment in Fig. 2, which means permits the bar to move the initial distance without affecting the airpassage 140. When the bar continues downward beyond this point the air vent 144 will be opened by positive action.

The reading bar 101 has 21 vents 112 for translation of a group of single letters or of a group of figures and signs used in Full Spelling, thus requiring change of translation from one of these groups to the other and also requiring shift between upper and lower cases. The Full Spelling division of the translator thus must have 21 primary bars besides a few control bars for selections of group and shift, which selections pass through the system for control of corresponding Stunts in the final typewriter.

The coding further provides for the simultaneous use of two, three or four of the same 21 vents 112 for the selection of other single letters for which there are no keys in the code recording machine nor vents in the reading bar. These may appear in upper and lower cases, but not in the figures and signs groups.

A few standardized translator units 120 may be provided for the secondary bars in Full Spelling with about 25 primary bars connected together between the units. For example, two units 121 and 122 may be used for all secondary bars representing single characters and one unit 123 may be used for all two or three letter secondary bars in Initial, Vowels, Final. All code cuttings in the primary bars are of course different and in the three units the Initial bars cooperate, the Vowel bars also and the Final bars too. These three sections of bars are however independent but may supplement each other in any single setting effected by a row of punchings 110 on the reading bar 101.

The code cuttings in the primary bars in the Phonetic division are entirely arbitrary and are made in accordance with the requirements of any Phonetic or Phrasing codes that are included in the system at any time. Any single punching or any combination of punchings appearing in a single row across the record tape 100 may be used for setting the primary bars.

Each setting of one or more primary bars will select one secondary bar which thus represents a single word or any number of words, a formula of symbols, together with any stunts, such as "spacing." Common practice alone puts a limitation on the length of the phrases, which for ordinary letter writing would not include more than 3-4 simple words.

A requirement is this; that the code combination used in Phonetic should not include those used in Full Spelling for whole words or syllables. However since many codes in Phonetic would find response in one or two sections of the Full Spelling division, the Phonetic is given first chance for testing the setting of the primary bars, and only when no secondary bar responds here will the testing be transferred to Full Spelling for setting of two or three secondary bars there. The sequence of testing is controlled by a suitable timing arrangement 170 which is started for each new operation of the system, and which either will be stopped and restored indirectly by the operation of a secondary bar in Phonetic or will continue till it admits secondary bars in Full Spelling for testing.

The outgoing code spelling system is shown schematically in Fig. 2. It comprises a plurality of spelling units 200, one for each secondary bar 133 in the translating system, except those representing single letters in Full Spelling. The units 200 may be arranged in groups, one group for each translator unit 120. No units 200 are required for the two single letter translator units 121, 122. There are groups of units 203, 204, 205 etc. for corresponding units 123, 124, 125 etc. in the translator.

Each unit 200 comprises a pivoted code vane 210 for normally closing a plurality of vents 211 for air passages or tubings 220, normally under suction, leading to the sequence control equipment in Fig. 3. The vane 210 is held against the vents by a spring and is operated by a trip valve controlled bellows 214 to open all the vents simultaneously. Each of the bellows 214 of the units is controlled by a secondary bar 133 to be operated when the air passage 140 is opened in response to the full movement of a selected secondary bar.

Each suction tubing 220 represents a symbol or stunt included in the outgoing code represented by the associated secondary bar 133. Thus if that code includes, say, four letters and SP for "spacing" the vane 210 will control five tubings 220. The connections for the air passages 220 to the sequence control equipment in Fig. 3 are shown in a sequence tubing multiple 250 along the bottom of Fig. 2.

The horizontal lines represent a large plurality of suction tubings 250, one from each sequence valve unit 300 of the sequence control equipment, thus representing corresponding outgoing symbols in the ultimate typewriter or other repeating equipment. Each outgoing symbol (or stunt) may however be thus represented once, twice or several times and may thus appear in different portions of the line-up of tubings 250. The order of the tubings 250 is preferably the same as that of the sequence valve units, and it is not alphabetical but is determined by the requirements of the language.

Thus for convenient connection of the air passages or tubings 220 in accordance with code requirements in each case, a multiple connecting rack 255 may be provided for each of groups 203, 204, 205 etc. and for each of the groups of air passages 140 from translator units 121, and 122.

A sequence control equipment is shown schematically in Fig. 3 together with a schematic showing of the more pertinent elements of an outgoing code repeating equipment (ultimate typewriter). This equipment may be a pneumatic typewriter which appears along the top of Fig. 3.

A typewriter will have some 40–45 keys or levers 380 which must be operated by individual bellows 382. About half a dozen keys are for operation of Stunts, and the remaining for symbols, such as letters, numerals and signs.

The sequence control system is connected between the outgoing code spelling equipment and the typewriter to receive in one setting thereof the spelled-out code for one row of punchings 110 in tape 109 and to impress the individual symbols in such setting, one at a time, upon the typewriter for typing and stunts.

The system comprises mainly a long series of similar control valve units 300 having their input side connected to individual suction tubings or air passages 250 in the sequence tubing multiple. Each sequence valve unit 300 includes two trip valves 310 and 320 having an output tubing 384 connected into a printer tubing multiple 399 for the typewriter bellows 382. The valve units 300 are serially interconnected through series tubings 330 for sequential operation of such units as have been selected simultaneously by the code spelling equipment, for sequential operation of the associated typewriter keys 380.

Pertinent details of the control valve units 310 and 320 are shown in Fig. 7, which shows a pair of the valves in fairly full details and another pair in more diagrammatical fashion substantially as used in Fig. 3 for simplicity.

The valve 310 has two alternate valve seats 311 and 312, the upper seat 312 being normally closed and the lower seat 311 normally open, the normal condition being here assumed to be the inactive state before the valve is selected.

The valve 310 has three chambers, upper-middle-lower, and a valve stem 313 carrying at its lower end a weight 314 weighing down the slack operating diaphragm 315 mounted between the middle and lower chambers. The stem carries two valve discs 316, 317 cooperating with the seats 311, 312 to close one or the other.

The valve 320 has one valve seat 325 which is normally closed. It has three chambers, and a valve stem 313 with a weight 314 and a diaphragm 315, as in valve 310. The stem carries one valve disc 321 for the seat 325.

On the input side (left) of the valves 310 and 320 the suction supply 160 is connected through series tubing 330 directly to the middle chambers of the first pair of valves 310, 320 in the series, the left hand pair in Fig. 3. With suction cut-off in rest condition the two valves remain with the diaphragms weighted down. The control device, in this instance assumed to be a code vane 210, is connected to the lower chamber of valves 310, 320 over the tubing 250 in the sequence tubing multiple, the tubings being normally closed at vane 210. The middle and lower chambers in each valve are interconnected by means of a bleeder 318 so that changes in the pressure condition in the middle chamber may be comparatively slowly imparted to the lower chamber.

On the output side of the valves the uppermost chamber is connected to output tubings, such as 330 or 384, for changing the pressure condition therein as the stem 313 is moved up or down. Thus valve 310 is connected up over the series tubing 330 to control pressure in the middle chambers of the next succeeding valves 310, 320 and the associated valve 320 is connected over tubing 384 for control of typewriter bellows 382. The series circuit 330 is repeated between all succeeding valve units, so that any one unit can control any subsequent unit right down through the series.

At the time of starting operation for a new cycle, suction is applied from supply 160 to the middle chamber of a pair of valves and is bled through bleeder 318 to the lower chambers and out into the control tubing 250. With tubing 250 closed suction is present on both sides of the diaphragms, consequently the valves make no response and operating circuit 384 remains closed at valve seat 325. However with tubing 250 open to air at vane 210 the diaphragms will be raised by the suction applied to the middle chambers from supply 160, air will be admitted at valve seat 312 to series tubing 330 and air will be extended through valve seat 325 to the operating circuit 384 for a bellows, such as 382, which thus will be operated by its associated trip valve. Upon subsequent closing of tubings 250 both valves and bellows will return to normal.

The stem 313 in valve 320 has a locking arrangement at its upper end, which comprises a pivoted bar 322 which, when the stem is raised, will be held by a catch 323. This serves the purpose of operating a cut-off valve 340 located in the control tubing 250 for the pair of valves. The cut-off valve 340, in operating, replaces the open condition at vane 210 in tubing 250 by closing the input tubings to the lower chambers of both valves. Thus suction will build up in both lower chambers from the series tubing 330 through bleeders 318, and as the pressures reach a stage of equalization in the lower and middle chambers the stems 313 will return to normal, awaiting the next cycle.

When valve 310 returns to normal, after a brief interval adjustable at bleeder 318, it immediately extends suction over valve seat 311 to succeeding valve units over series tubing 330.

It should be noted that valve 310 is adjusted at its bleeder 318 to operate quickly in both directions, fitting into a tempo set by the speed of the typewriter. Valve 320 is however adjusted to not respond to vane 210 until most of the succeeding valves 310 in the series have been de-vitalized over series tubing 330 by the closing of valve seat 311 in valve 310. Thus subsequent valves 320 will be prevented from operating at this time.

When the valve 320 operates and manipulates valve 340 to prevent further operation of the unit, it quickly restores and cuts off air applied at valve seat 325 for operation of the typewriter bellows 382, the timing being such that the bellows merely serves to give the type key 380 a stroke for momentum and is restored without affecting the return of the key. By such timing of both valves keys may be operated in rapid succession.

At the end of a cycle a release bar 350 will be operated to the right to release all operated levers 322 through catches 323, thereby restoring valves 340 to normal.

A typewriter tubing multiple 390 is provided for the key bellows 382, each of which is connected to one of the multiple tubings. Several connections 384 from sequence valves 320 which represent a given symbol, are connected to one multiple tubing 390 for that symbol.

The "Outgoing Code Sequence" established by the sequence control equipment permits the presentation by a spelling vane 210 of any code translation all at once to the sequence control system for transfer of one character at a time to the ultimate typewriter. The instantaneous capacity of a system for general letter writing would, for economical reasons, be limited to accommodation of the letters involved in frequent phrases of three or four simple words. This means that the outgoing code spelling equipment should impress such a phrase in one setting upon the sequence series of valve units 300. In such a phrase any letter, such as e, may appear a number of times, and all letters will usually appear in any order other than the alphabetic.

It is therefore provided that in the series of valve units, most letters are each represented by a few dispersed units, both so that they may appear a few times in one setting and so that they may appear before or after various other letters in that same setting. For ordinary commercial service a series of 150 to 200 valve units will suffice. The series also includes a few Stunts which may appear a few times, such as SP for "spacing" of two or three words in a phrase. In Patent 2,873,837 an example is given of a plausible arrangement of unit numbers and assigned letters for the sequence units.

The system includes a conventional suction tank 161 which is automatically kept at a substantially constant subpressure by a suitable pumping outfit and control equipment which form no part of this invention. These parts are unaffected by the operations in the whole system.

The system further includes a main suction distribution tubing system 150 connected to supply suction from the tank directly to various elements or devices throughout the system. This tubing system is not shown completed to all points in Figs. 1, 2 and 3, but its connection at each point is indicated by a circle marked 150.

The output tubing 160 of the tank 161 is connected to tubing system 150 through a cut-off valve 162 which is similar to valve 310 and serves to cut the constant suction from the tank off from and on to system 150 in response to operation of the stepping pawl 105 of the tape reading device in Fig. 1 at the end of each cycle.

Certain points in the system are connected directly to the output tubing 160 of the tank. Some of these connections are not shown, but are indicated by a circle marked 160.

The bellows used in different parts of the system for performing mechanical operations are normally relaxed by a return spring usually on the element which is operated. Suction applied to the bellows will overcome the spring tension and perform the assigned operation. The application of suction is usually through a tripvalve, such as valve 320 in Fig. 7, which is much quicker in response than the bellows. The tripvalve may when necessary be locked operated by connecting the stem 313 to a locking arrangement such as 322, 323 shown in Fig. 7, to become released when the bellows completes its operating stroke.

Since this combination of bellows and tripvalve is well-known and is auxiliary to the system the valve is included as a simple bloc in the bellows symbols used in the diagrammatical showings in the drawings.

*Detailed description of operation of system shown in Figs. 1, 2 and 3*

It will be assumed that the code reading device, Fig. 1, is in the act of taking a step for advancing the record tape 100 on the reading bar 101 after the system has performed a complete function.

As will be explained later the operation of the stepping lever and pawl 105 for advancing the tape driving roller 102 opens the vent 108 thereby causing the operation of valve 162, similar to type 320 in Fig. 7, which in turn disconnects suction tank 161 from the suction supply network 150, thereby devitalizing most of the system and causing most operated elements to return to normal, ready for the next function.

Thus the lever 105 will also return to normal and close vent 108 for restoring valve 162 to normal, and suction is again applied to the suction supply network 150 for the next function.

In the following, initial consonants will be indicated thus "t–" and final consonants thus "–t."

It will now be assumed that the new code row on the tape 100 presents only one punching 110 to the reading bar 101, and that this punching represents the letter "–t," which is the code in Phonetic for the word "the."

No such single code letter can be used for response in Full Spelling.

Thus all reading vents 112 will be placed under suction, except the one for letter "–t."

Since these vents connect through a tripvalve, like 320, to the individual operating bellows 132 for the primary bars 131 in all the translators in Fig. 1, only the vent for letter "–t," in admitting air to its associated tripvalve, will operate its bellows 132. Thus a primary bar 131 for "–t" will be set in alternate or selected position through all the translators.

At the time suction was applied to the supply system 150 the timing arrangement 170 began to function.

This arrangement may of course take any one of several obvious forms. A preferred arrangement includes a tubing switch 174, having a normal position, as shown, and including a mechanical timing device 173 which operates to throw the switch to alternate position after a predetermined interval. A tripvalve operated bellows 172, when operated shortly after the start of a cycle, prevents the switch from leaving normal or, when operated at the end of a cycle, restores the switch and timer to normal. When the bellows 172 is released the timer begins to work.

In the normal, right hand position the switch 174 connects air to all the operating bellows 135 for the secondary bars 133 in the Phonetic translator units 124, 125, etc. whereas in the alternate, left hand, position the switch 173 connects air to all operating bellows 135 in the Full Spelling translator units 121, 122 etc.

A control circuit for the timer bellows 172 is normally closed at a vent 176 in a bellows operated switching device 180, to permit this timing operation to be completed.

The arrangement is such, that when suction is first supplied to the system and air extended over switch 174 in normal position to the bellows 135 in Phonetic, these bellows will operate after a slight delay due to adjustment of their tripvalves, thereby giving the primary bars time to operate before the secondary bars 133 are lowered for testing. As the testing bail 134 in each translator unit 124, 125 etc. moves down the secondary bars 133 follow until they engage the edge of the primary bars 131.

In the present instance the secondary bar for "–t" in unit 124 will find a clear path to continue beyond that level and thus will open the vent 144 for an airpassage 140 to the transfer equipment. All other bars 133 will be stopped by primary bars and prevented from opening their associated vents.

In the diagrammatical showing in Fig. 1 of the translator units the crossing points between primary and secondary bars at which selections will take place are indicated by × in a few instances.

The airpassage or tubing 140 from the secondary "–t" bar leads to the tripvalve controlled bellows 214 of the spelling unit 200 for "–t" in the group 204, associated with translator unit 124, see Fig. 2.

In the spelling unit for "–t" the code vane 210 has three tubings 220, representing the assigned outgoing letters "t," "h," "e," connected up to the vents 211 and one tubing 182 from the switch bellows 181 connected up to a fourth vent 211. These vents are normally closed by the vane 210.

Thus when the tubing 140 is opened at the secondary bar 133 the bellows 214 operates on suction from 150 and the code vane 210 opens all four vents 211. This opens the tubing 182, causing bellows 181 to operate the switching device 180 for opening vent 176 for the timer 170. The bellows 172 in the timer restores the timer preventing it from operating the switch 174 to Full Spelling. This condition then prevails until, at the end of the operating cycle, suction is removed from the system and switching device 180 is restored to normal. When thereafter suction is again applied the timing device 170 again begins its slow function, bellows 172 being released since vent 176 is closed.

It should be noted that each spelling unit 200, which is associated with the Phonetic translator has a vent for tubing 182 leading to the switching device 180 so that whenever such a unit is selected the timing device 170 will be restored and prevent operation of the Full Spelling translator. At the same time a vent 178 on the switching device 180 will be opened for the purpose of adding a last Spacing to the Phrasing and Phonetic code in the setting.

The tubings 220 from the three code vents 211 of the vane 210 for "–t" lead to three openings 256 in the multiple connecting rack 255 assigned to group 204, where they connect with three multiple tubings 250 which lead to three sequence control valve units 300 in the sequence control or storing system, shown in Fig. 3.

These valve units should represent the three letters "t," "h," "e," respectively, and should appear in that order in the valve series. In a series of 200 units such three units may be picked in different ways, such as

```
    12–t,   14–h,   17–e
    31–t,   32–h,   38–e
    62–t,   73–h,   91–e
or  12–t,   32–h,   91–e  a.s.o.
```

The series thus provides considerable freedom in choices, so that a short word, such as "the," may be placed before or after other short words in one single setting in the sequence series of valves, as for frequently used phrases.

As shown in the drawings the connection on the rack 255 are made for valve units 31–t, 44–h, 59–e in Fig. 3.

When, at the beginning of the operating cycle, the system was devitalized spelling vanes 210 were released so that all valve units 300 were returned to normal. Suction from the suction supply 160, at extreme left in Fig. 3, is steadily extended through the middle and upper chambers of the first valve 310 and over the series tubing 330 to the middle chambers of the next valves 310, 320, through middle and upper chambers of this valve 310 and over the next series tubing 330 a.s.o. (for details see Fig. 7).

With all the code valves 200 in the transfer system in normal position, with their vents 211 closed, all valves 310, 320 will remain normal. However when the vane for "t," "h," "e" opens its vents as described, air will pass through tubings 220 and 250 into the lower chambers of the corresponding three units of valves 310, 320.

To follow the progress of operations: air enters both lower chambers of the unit 31–t. The through-valves 310 are adjusted for quick response and branch valves 320 for slightly slower response. Thus valves 310 in units 31–t, 44–h, 59–e operate and extend air through their upper chambers to the series tubings 330 and through middle chambers of subsequent valves 310 in the whole series, thereby replacing the suction and incapacitating all valve units except the first one, 31–t.

The valves 320 should be slow enough so that they will not operate before air has entered the whole series. The valve 310 in unit 31–t remains operated. The valves 310 in the other selected units 44–h and 59–e return to normal before their associated valves 320 can operate.

Then valve 320 in unit 31–t operates and applies air through its middle chamber to tubing 384, which is connected to the tubing in the printer multiple tubing 390 leading to the bellows 382 for the typewriter key 380 assigned to the letter "t." The valve stem 313 operates lever 322 which locks on catch 323 (see Fig. 7); the lever 322 operates cut-off valve 340 to cut off the air supply over tubing 250 to lower chambers in both valves 310 and 320. Thus valves 310 and 320 will release after a short interval thereby again extending suction from supply 160 through the series to the next pair of valves in unit 44–h which happens to be selected also.

With the associated tubing 250 open at the far end this pair of valves will then operate in the same manner, operating the key "h" in the typewriter, the valve 340 operating and locking. When both valves return to normal valve 310 extends suction through a few succeeding unselected valves 310 to the selected unit 59–e for operation of key "e." Valve 310 again extends suction through the remaining unselected units in the series to the unit 200–SP at the end of the series.

This unit is automatically selected to finish each code with a Spacing selection when the Phonetic translator is operated. Thus when the switching device 180 was operated it opened the vent 178 for tubing 179 leading to the lower chambers of valve unit 200–SP. In the absence of suction throughout the sequence series at this time valve 310 in this unit remains unoperated. Upon arrival of suction after unit 59–e has operated, unit 200–SP operates for the operation of the Spacing bar SP in the typewriter, by the valve 320.

Thus the word "the" has been printed followed by a Spacing operation.

Beyond the unit 200–SP the series circuit 330 is extended into a unit 200–End of type 320 valves provided for different functions in the system at the end of each cycle. Three such valves are provided for the present system. An additional control valve 320a serves to hold the three release valves idle during the cycle and permit them to operate when the chain circuit is restored upon completion of a transmission.

The valve 320a is similar to the valve 320 shown in Fig. 7 and thus includes a locking lever 322a and cut-off valve 340a, which however operate in a slightly different manner.

Thus when the sequence system is waiting for a new selection the chain circuit is extended to all four valves 320 and 320a. Valve 320a is operated but valves 320 are disconnected from air at valve 340a and thus are released.

When now one or more code units 300 are operated suction from 160 will be taken off unit 200–End and valve 320a relaxes and by the inner diaphragm weight pulls lever 322a down to locking position and turns cut-off valve 340a to apply air to the three valves 320.

When the chain circuit has been run down suction is again supplied to the end unit. Valve 320a operates, but only flexes its connection with the locked lever 322a. The three valves operate to reset the whole system for a new operation thereby causing the operation of the release bar 350, which in turn restores lever 322a and cut-off valve 340a. Thus the three valves will be released, valve 320a remaining operated.

The system thus is again in waiting condition.

Thus when one of these valves 320 (the middle one) operates it admits air to the tubing 118 and the bellows 106 (Fig. 1) will operate, perhaps with a slight, controlled delay to pull up the stepping pawl 105. Near the full operation of the pawl the devitalizing vent 108 is opened for operation of cut-off valve 162, which cuts off suction from most of the system, thereby also restoring pawl level 105 which advances the tape driving roller and the tape one step. Thus the tape is advanced in the absence of suction in the reading vents 112.

During the return stroke of the pawl the vent 108 is closed thereby again releasing valve 162 for application of suction to the supply system 150 for the next cycle.

At the same time the stepping bellows 106 was operated bellows 351 were operated over tubing 352 by the upper valve 320 in unit 200–End. These bellows operate release bars 350, each of which serves to release the valve stems 313 in a group of valves 320. Thus all valves 340 in the sequence series are restored.

The lower valve 320 in unit 200–End is connected over tubing 117 to operate bellows 172 for the timing device 170, which thus will be restored to normal whenever it has operated. Since this bellows is independent of the valve 162 which terminates a cycle, the switch 174 will condition the secondary bars 133 in the Phonetic translator for testing before the beginning of the next cycle.

For the sake of proper timing and speeding up, the middle valve 320 in unit 200–End, may instead be added to the unit 200–SP and operate therewith, for starting the devitalizing operations earlier than the various release operations by the unit 200–End.

The timing for the operation of valve 162 for shutting off suction may readily be adjusted so that all necessary functions may first be completed, particularly those controlled from the unit 200–End.

The following example of operation relates to Full Spelling with code punchings for the word "thee" and Space presented to the reading bar.

In the absence of a Phonetic code for this word it will be spelled out on record tape 100 as "t–," "h–," "o," "e," and corresponding primary bars operated in response thereto.

Upon reapplication of suction to the system the timer 173 begins to work. Since no secondary bar 133 in Phonetic nor associated vane 210 will respond to this setting, the timer will continue to work and finally operate switch 174 which disables Phonetic and applies air to the bellows 135 in the Full Spelling translator. The secondary bars 133 which will respond will be those for "t" and "h" and SP in unit 121 and "oe" in unit 123.

The tubings 140 from the vents 144 on bars "t," "h" and SP do not lead to spelling units, since no further spelling-out is required; they lead directly to the sequence tubing 250 for selection of sequence valve units, which may be 31–t, 44–h, 200–SP.

The vent 144 on the bar "oe" controls a spelling unit 200 in group 203 from which tubings 220 are connected up to tubings 250 for selection of sequence valve units, such as 59–e, 94–TM, 135–e. Thus the spelling will be in the proper sequence.

The unit 94–TM and other similar units are included in the sequence series to introduce a time interval between double letters, such as "ee," to give the typewriter key time for a double operation. The timing unit simply uses its own time to operate its cut-off valve 340 before extending the series circuit 330 to the second letter.

The reading vent 112 on the bar 101 for SP connects over tubing 119 directly to the multiple tubing 250 for the sequence series and in the presence of the punching for SP causes the operation of the unit 200–SP after the word "thee" has been printed.

*Description of alternative equipments in accordance with the invention*

In Figs. 3, 5 and 6 pneumatic tubing and electric conductors are shown by single heavy lines, but they should readily be recognized by the type of apparatus, pneumatic or electric, which they are connected between.

Reference will now be made to the equipment shown in Figs. 3 and 4 which will be assumed to be operated from the equipment shown in Figs. 1 and 2, functioning in the manner described above.

The sequence control series will be assumed to operate as before in response to the symbols "t," "h," "e," followed by SP. It will operate the corresponding bellows 382.

In accordance with the present alternative the operating lever of each bellows is provided with normally open electric contacts 383 connected for control of electric equipment, shown in Fig. 4, for reproduction of the translated code unit from the associated sequence unit.

For the present purpose a device 496 is provided capable of receiving a permutation code of, say, five units and reproducing individual combinations of such code on a tape advanced once for each combination for further retransmission. The tape may be punched by a perforating magnet 498 under control of, say, five selecting magnets 499 for selecting the perforating punches.

The tape may be marked in other ways with markings affecting magnetic, electric, optical a.s.o. equipment for retransmission.

In Fig. 4 the device 496 is represented as an electric tape perforator which may be of well-known design.

The system includes a plurality of operating relays 482, each of which is operated from contacts 383 of a corresponding bellows 382 and thus represents the same translated code unit.

Each operating relay 482 has an arrangement of permutation contacts 483 connected over a permutation wire multiple 495 for operation of one or more of the selecting magnets 499, as required for the assigned translated code unit.

Fig. 4 shows only the operating relays 482 for the letters "t," "h," "e" and SP impressed thereon, one at a time, by the corresponding sequence units.

Thus when the bellows 382–t is operated its contacts 383 close the circuit for operation of operating relay 482–t, which then applies current over the permutation wire multiple to the selecting magnets 499, magnet 5 in this case for "t," which operates.

Relay 482–t also closes its contacts 484 for its own locking winding to lock the relay when the quick bellows 382 return to normal, and its contacts 485 operate the common control relay 491, which is slow operating and after an interval operates its make before break contact to first operate perforator magnet 498 for punching the tape for "t" and then open the locking circuit for relay 482–t. When this relay releases the selecting magnet is restored and relay 491 is released quickly.

The system thus is ready for action on "h."

The speed of the sequence series may be adjusted to be slightly slower than that of the perforator, by adjustment of valve 320, as already explained.

For "h" selecting magnets 3 and 5 will be operated, for "e" magnet 1 and for SP magnet 3. Thereafter sequence unit 200–End will operate and return the system to normal for the next incoming code.

Reference will now be made to the equipment shown in Fig. 5, which will be responsive to operations of the equipments shown in Figs. 1 and 2 in the manner already described.

In the sequence control series 500 each unit comprises a pneumatic trip valve and bellows 510 and an electric relay 520. The number of such units and their general function in the system are substantially the same as in the series shown in Fig. 3. But this alternative is considerably simplified and quicker in operation, which is of the greatest importance, considering the length of the series.

The trip valve and bellows combination 510 may be of standard construction, similar to others shown in this system. Its operating lever 517 engages alternate electric contacts, the normally closed contact being included in a series circuit 530 through similar contacts of all other units for control of the series while the relay 520 is in operation. The other, normally open, contact is connected for control of the relay 520.

The bellows 510 are connected through the tubing multiple 250 to the spelling units 200 in Fig. 2 for response to opening of the vents 211, as in Fig. 3.

Each relay 520 has contacts 521, one being normally closed to extend the operating circuit from the operated contact of the associated valve unit 510 to an associated relay 570, which thus will operate and open the tubing for the operating bellows 582, corresponding to the bellows 382 in Fig. 3.

Bellows 582 thus will be operated, and in turn may directly operate an assigned key lever 580 of a typing machine or it may close electric contacts 583 for operation of a key magnet in an electric typewriter 596 or a similar device.

The equipment just described is individual to a code element in the translated outgoing code; it is repeated for all the code elements and is controlled over the outgoing code multiple 590 from one or more of such code units in the sequence series as are assigned to each outgoing translated code.

The normally open contacts of slow operating relay 520 of the sequence series will, when closed, bridge the opened contacts of valve 510, thereby extending the chain circuit to the next operated valve 510 along the series for operation of another equipment assigned to a corresponding key in the typing machine 580 or 596.

It should be noted that in the alternative arrangement shown in Fig. 5 all valves 510 in the sequence series that are simultaneously selected by a spelling unit 200, shown in Fig. 2, will be operated simultaneously and will remain operated until the series is run down. Any valve 510 thus keeps the chain circuit 530 open until the system restores for a new setting.

It should be further noted that a relay 520 passes on the code element to the recording equipment without delay and after an operate interval restores the chain circuit 530 around the open contacts 517 of the operated valve 510, thereby immediately applying the chain potential to operation of the relay 570 in the next selected sequence unit. Relay 520 may be timed to operate for safely permitting the code element to pass through for recording before the next selected sequence unit is operated. It remains operated till the sequence chain has been run down.

For restoration of the system to normal two tripvalves 320 are provided as in Fig. 3 for operation over the tubings 117 and 118 as described for Fig. 3.

These tripvalves are operated by a set of electric relays 561, 562 and electric magnet 560 which will open the control tubing for the valves as soon as the sequence series 562 has completed its last operation, and restored the chain circuit 530, at which time the chain circuit will be extended into relay 561.

At the time of restoration of the system the completed chain circuit will operate relay 561; when the chain is opened by one or more sequence units relay 561 releases and operates relay 562. When the chain is restored by operation of the last selected sequence unit relay 561 operates and temporarily operates magnet 560 for operation of the two restoring valves 320. Relay 562 is made slow releasing to hold magnet 560 long enough for this purpose.

It should be understood that in accordance with the invention the electric contacts 583 of the bellows 582 may be connected to corresponding relays 482 in Fig. 4 for operation of the tape recording device 496 in the manner already described. The connections required for this purpose between Figs. 5 and 4 appear to be obvious and thus need no further showing in the drawings for a proper understanding of this modification.

Another alternative arrangement of the retransmission equipment is shown in Fig. 6.

In the sequence control series 600 each unit includes a tripvalve and bellows 610 which is similar to the valve and bellows 510 in Fig. 5 and operates in the same manner. The unit also includes an electric relay 620 which corresponds to relay 520 in Fig. 5 and performs corresponding functions.

The equipment also includes a device 696 which may be a telegraph transmitter based on a 5 unit start-stop operation, as in the teletype system, and depending on a rotating distributor 694, partly shown, for retransmission of the signals, one unit at a time, over a line circuit. The device also includes five selecting magnets 699 responsive to the impressed code for applying permutation potentials to the distributor segments during each rotation, and a start magnet 698 for releasing the brush arm for each revolution.

The magnets 699 are operated by a plurality of electric operating relays 682 which are similar to the relays 482 in that they are operated, one at a time, in response to translated code elements from the sequence series 600 and close corresponding contacts 683 for the permutation wire multiple 695 leading to the selecting magnets 699.

The operation of the equipment shown in Fig. 6 is somewhat modified from those of the equipment shown in Figs. 3 and 4 and in Fig. 5, since the device 696 retransmits the five unit signal one unit at a time and usually includes a start and a stop pulse with each transmission. The system therefore must be held up for each code element before making a new setting.

For the operation of the system in Fig. 6 it will be assumed that all operations through Figs. 1 and 2 are the same as those described for the operation of Fig. 3.

Thus valves 610 in the valve units 31–t, 44–h, 59–e and 200–SP will receive air over the multiple tubing 250 and thus will be operated. These valves remain operated until the whole system has completed its functions for the word.

In unit 31–t the electric contacts 617 open the series circuit 630, thereby preventing the other units from responding to their valve operation.

The contacts 617 close an electric circuit from the chain ground over contacts 621 of relay 620 to the wire multiple 690 and then through the winding of relay 682–t to battery at contacts 697. Relays 682 may be slightly slow operating to prevent accidental operation of more than the first one in the series. Relay 682–t thus operates and closes the code contacts 683, which are connected to the permutation multiple 695 in accordance with the code for "t," thereby applying battery to the code magnets 699 in the transmitter 696. As is well known these magnets, when selectively operated, condition sending contacts in the distributor for the transmission of the code impressed on the magnets, or a different assigned code.

Relay 682–t also operates its control contacts 681 for operation of the start magnet 698 by applying battery thereto over normally operated contacts of slow operate relay 691.

When the distributor arm 692 starts rotating make before break contacts 697 are operated and first close the circuit for the locking winding of relay 682 and next open the battery circuit for the operating winding of relay 682.

When relay 682 operated it also applied battery over its contacts 681 over contacts of normally operated relay 691, through the operating winding of relay 620 to the chain ground over contacts 617 of valve 610–t. Relay 620 operates and locks over its contacts 622.

The code unit 31–t now remains operated until the end of the operations of the sequence chain.

When contacts 697 operated relay 691 quickly released, thereby removing battery from the start magnet 698 which returns to normal ready to stop the distributor arm in stop position.

When relay 620–t operated its contacts 621 opened the operating circuit for code relay 682–t, which however remains locked up until the distributor arm returns to stop position. Contacts 621 also bridged the open chain contacts of valve 610–t thereby extending the chain ground over operated contacts 617 of valve 610–h and contacts 621 of relay 620–h to the operating winding of relay 682–h, which at this time is disconnected from battery at contacts 697 of the now rotating distributor. Relay 682–h thus is prevented from operating while relay 682–t is locked up.

When the distributor returns to stop position battery is applied at contacts 697 to the waiting relay 682–h which operates. Immediately after that battery is removed at contacts 697 from the locking circuit of relay 682–t, which releases.

Contacts 697 also apply battery to slow operate relay 691 which applies delayed battery to the start magnet over contacts 681–h, thereby starting the distributor off again and starting a new cycle with the code magnets 699 set for the letter "h."

When the units for "t," "h," "e" have been operated the chain circuit is extended to the unit 200–SP which will operate relay 682–SP for sending a code representing "spacing."

The chain 630 will be extended over relays 661 and 662 to slow magnet 660 which will apply air to the unit 200–End after the distributor has returned to stop position, as descibed in connection with relays 561 and 562 in Fig. 5. This end unit of valves 320 then operates to discontinue the present spelling cycle and start the next cycle, as described in connection with Fig. 3.

What is claimed is:

1. An automatic code translating system which comprises an input side for simultaneous translation of a plurality of incoming code elements, an output side for reproduction of the translated code elements one at a time and an intermediate sequence control system for transferring the translated plurality of code elements to said output side, one element at a time; said sequence control system comprising a plurality of similar code units each responsive to one assigned translated code element and a series electrical chain circuit interconnecting said code units for their transfer operation, one unit at a time, said units each including a first switching means connected for opening said electrical chain circuit and for transferring its assigned code element onto the said output side for reproduction and a second switching means responsive to said first switching means for subsequently extending the electrical chain circuit to the next code unit.

2. An automatic code translating system which comprises an input side for simultaneous translation of a plurality of incoming code elements, an output side for reproduction of the translated code elements one at a time and an intermediate sequence control system for transferring the translated plurality of code elements to said output side, one element at a time; said sequence control system comprising a plurality of similar code units each responsive to one assigned translated code element and a series electrical chain circuit interconnecting said code units for their transfer operation, one unit at a time, said units each including a first switching means connected for opening said electrical chain circuit and for transferring its assigned code element on to the said output side for reproduction and a second switching means responsive to said first switching means for subsequently extending the electrical chain circuit to the next code unit; said first switching means in all responding code units being operative simultaneously.

3. An automatic code translating system which comprises an input side for simultaneous translation of a plurality of incoming code elements, an output side for reproduction of the translated code elements one at a time and an intermediate sequence control system for transferring the translated plurality of code elements to said output side, one element at a time; said sequence control system comprising a plurality of similar code units each responsive to one assigned translated code element and a series electrical chain circuit interconnecting said code units for their transfer operation, one unit at a time, said units each including a first switching means connected for opening said electrical chain circuit and for transferring its assigned code element on to the said output side for reproduction and a second switching means responsive to said first switching means for subsequently extending the electrical chain circuit to the next code unit; said first switching means in all responding code units being operative simultaneously and said second switching means in said units being operative one at a time as said electrical chain circuit is extended by a preceding second switching means.

4. A translating system in accordance with claim 3 in which said first and second switching means are adapted to remain operated until all responding code units in the chain circuit have been operated for their transfer function.

5. An automatic code translating system which comprises an input side for simultaneous translation of a plurality of incoming code elements, an output side for reproduction of the translated code elements one at a time and an intermediate sequence control system for transferring the translated plurality of code elements to said output side, one element at a time; said sequence control system comprising a plurality of similar code units each responsive to one assigned translated code element and an electric series chain circuit interconnecting said code units for their transfer operation, one unit at a time, each of said code units including switching means connected for interrupting said chain circuit and for transferring its assigned code element on to the said output side and electric relay means responsive to said switching means for subsequently restoring said chain circuit.

6. A translating system in accordance with claim 5 in which said code units are connected to said input side to remain operated therewith until all responsive code units in the series have completed their transfer function.

7. A translating system in accordance with claim 5 in which said switching means and electric relay means are connected to remain continuously operated after their response to a translated code element and until completion of operation of the system in response to said plurality of incoming code elements.

8. An automatic code translating system which comprises an input side for simultaneous translation of a plurality of incoming code elements, an output side for reproduction of the translated code elements one at a time and an intermediate sequence control system for transferring the translated plurality of code elements to said output side, one element at a time; said sequence control system comprising a plurality of similar code units each responsive to one assigned translated code element and an electric series chain circuit interconnecting said code units for their transfer operation, one unit at a time, each of said code units including switching means connected to said input side for continued operation therewith in response to the assigned code element and having first electric contact means for interruption of said chain circuit, each of said units further including electric relay means connected to be continuously operative in response to the operation of said switching means and having second electric contact means for bridging said first contact means to restore said chain circuit and thereby extending it to the next responding code unit.

9. An automatic code translating system which comprises an input side for simultaneous translation of a plurality of incoming code elements, an output side for reproduction of the translated code elements one at a time and an intermediate sequence control system for transferring the translated plurality of code elements to said output side, one element at a time; said output side including electric repeating means for the reproduction of said translated code elements and a plurality of operating means each having electric contacts connected for operation of said repeating means in response to assigned code elements.

10. An automatic code translating system which comprises an input side for simultaneous translation of a plurality of incoming code elements, an output side for reproduction of the translated code elements one at a time and an intermediate sequence control system for transferring the translated plurality of code elements to said output side, one element at a time; said output side including electric repeating means for retransmission of said translated code elements and a plurality of electric operating means each having electric contact means connected for impressing permutation codes on said repeating means repersenting corresponding translated code elements.

11. An automatic code translating system which comprises an input side for simultaneous translation of a plurality of incoming code elements, an output side for reproduction of the translated code elements one at a time and an intermediate sequence control system for transferring the translated plurality of code elements to said output side, one element at a time; said sequence control system comprising a plurality of similar code units each connected to said input side for response to an assigned translated code element and said output side including electric repeating means for said code elements and a plurality of electric operating means each connected to one of said code units for transfer of the assigned code element to said repeating means.

12. A translating system in accordance with claim 11 in which each of said code units in said series has electric contact means connected for advancing the sequential operation of the code units along the sequence control system and has other electric contact means connected for transfer of the assigned code element to said operating means.

13. A translating system in accordance with claim 11 in which each of said code units in said series has electric contact means connected for advancing the sequential operation of the code units along the sequence control system and has other electric contact means connected for transfer of the assigned code element to said operating means; said repeating means including a rotating electric transmitting device for transmission of electric pulse combinations, and each of said operating means including electric relay means responsive to operation of the assigned code unit, said relay means having permutation contact means connected for selective operation of said device to produce a corresponding combination of permutation pulses.

14. A translating system in accordance with claim 11 in which said repeating means comprises a rotating code reproducing device for tape recording of a permutation code and each of said operating means includes a set of electric permutation contacts connected to impress simultaneously the units of a permutation code combination on said device representing an outgoing translated code element, said device including a plurality of selecting magnets responsive to the impressed code units for selective setting of said device, a recording magnet for operation of said device and electric control means connected for locking said operating means, then starting said device and unlocking said operating means.

15. An automatic code translating system including a translating section for simultaneous translation of a plurality of incoming code elements into outgoing code elements, a code reproducing section for the outgoing code elements and a sequence control series of code units connected to receive a plurality of individually assigned translated code elements from said translating section and impressing them, one at a time, upon said reproducing section, said code units being connected into a continuous series in a predetermined order for operation one at a time in said order in response to the plurality of translated code elements for transfer of those elements into said code reproducing section; said code reproducing section including electric repeating means for reproducing the outgoing code elements and a plurality of operating means connected for operation of said repeating means in response to the transferred code elements, each of said operating means being connected to be responsive to operation of an assigned code unit in said series and having electric contact means connected for operation of said repeating means.

16. A code translating system in accordance with claim 14 in which said code units are connected to said input side for continued operation therewith in response to the individually assigned translated code elements until said sequence control system has completed its sequential operation.

17. An automatic code translating system including a translating section for simultaneous translation of a plurality of incoming code elements into outgoing code elements, a code reproducing section for the outgoing code elements and a sequence control series of code units connected to receive a plurality of individually assigned translated code elements from said translating section and impressing them, one at a time, upon said reproducing section, said code units being connected into a continuous series in a predetermined order for operation one at a time in said order in response to the plurality of translated code elements for transfer of those elements into said code reproducing section; said code reproducing section including electric repeating means for the outgoing code and electric contact means adapted to be operated from said sequence control series for impressing selective electric current combinations on said repeating means, each combination representing a transferred code element.

18. An automatic code translating system including a translating section for simultaneous translation of a plurality of incoming code elements into outgoing code elements, a code reproducing section for the outgoing code elements and a sequence control series of code units connected to receive a plurality of individually assigned translated code elements from said translating section and impressing them, one at a time, upon said reproducing section, said code units being connected into a continuous series in a predetermined order for operation one at a time in said order in response to the plurality of translated code elements for transfer of those elements into said code reproducing section; said code reproducing section including electric repeating means for reproducing the outgoing code elements and a plurality of operating means connected for operation of said repeating means in response to the transferred code elements, each of said operating means being connected to be responsive to operation of an assigned code unit in said series and having electric contact means connected for impressing a selective current pulse combination on said repeating means representing the assigned transferred code element.

19. An automatic code translating system including a translating section for simultaneous translation of a plurality of incoming code elements into outgoing code elements, a code reproducing section for the outgoing code elements and a sequence control series of code units connected to receive a plurality of individually assigned translated code elements from said translating section and impressing them, one at a time, upon said reproducing section, said code units being connected into a continuous series in a predetermined order for operation one at a time in said order in response to the plurality of translated code elements for transfer of those elements into said code reproducing section; said code reproducing section including electric repeating means for the outgoing code and electric contact means adapted to be operated from said sequence control series for impressing selective electric current combinations on said repeating means, each combination representing a transferred code element; said repeating means including a rotating electric transmitting device for transmission of electric pulse combinations each representing one of said assigned code elements.

20. An automatic code translating system including a translating section for simultaneous translation of a plurality of incoming code elements into outgoing code elements, a code reproducing section for the outgoing code elements and a sequence control series of code units connected to receive a plurality of individually assigned translated code elements from said translating section and impressing them, one at a time, upon said reproducing section, said code units being connected into a continuous series in a predetermined order for operation one at a time in said order in response to the plurality of translated code elements for transfer of those elements into said code reproducing section; said code reproducing section including electric repeating means for the outgoing code and electric contact means adapted to be operated from said sequence control series for impressing selective electric current combinations on said repeating means, each combination representing a transferred code element; said repeating means including a rotating electric transmitting device for transmission of electric pulse combinations each representing one of said assigned code elements, and further including control means connected for relative timing of the operations of said device and said operating means for each code element.

References Cited in the file of this patent
UNITED STATES PATENTS

| | | |
|---|---|---|
| 2,248,583 | Potts | July 8, 1941 |
| 2,343,405 | Doty | Mar. 7, 1944 |
| 2,351,663 | Clark | June 20, 1944 |
| 2,352,952 | Haglund et al. | July 4, 1944 |
| 2,604,538 | Halvorsen | July 22, 1952 |
| 2,873,837 | Clark | Feb. 17, 1959 |